(No Model.)

F. SLETCHER.
GOLD WASHING PAN.

No. 585,989. Patented July 6, 1897.

Witnesses,

Inventor
Frederick Sletcher

UNITED STATES PATENT OFFICE.

FREDERICK SLETCHER, OF SAN FRANCISCO, CALIFORNIA, ASSIGNOR OF ONE-HALF TO AUGUST DANNENBRINK AND HENRY DANNENBRINK, OF GILTA, CALIFORNIA.

GOLD-WASHING PAN.

SPECIFICATION forming part of Letters Patent No. 585,989, dated July 6, 1897.

Application filed February 25, 1897. Serial No. 624,945. (No model.)

*To all whom it may concern:*

Be it known that I, FREDERICK SLETCHER, a citizen of the United States, residing in the city and county of San Francisco, State of California, have invented an Improvement in Gold-Washing Pans; and I hereby declare the following to be a full, clear, and exact description of the same.

My invention relates to improvements in pans such as are ordinarily employed by miners for hand-washing.

It consists in a novel construction of the pan and in other details, which will be more fully explained by reference to the accompanying drawings, in which—

Figure 1:
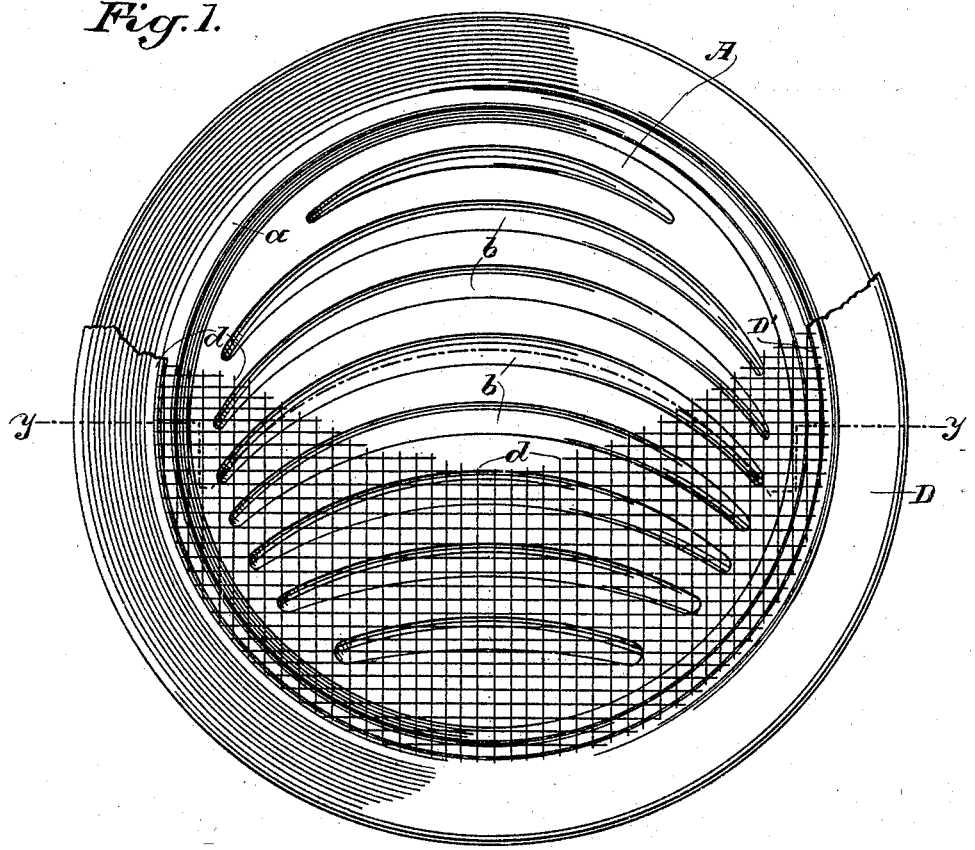
Figure 3:
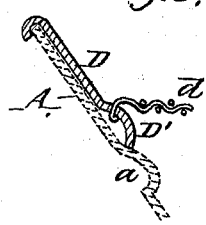
Figure 2:
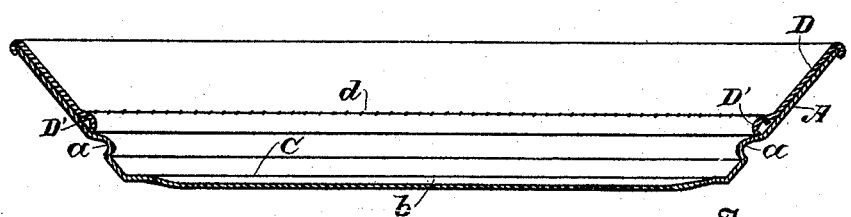

Figure 1 is a plan view of the pan and screen. Fig. 2 is a section on line $y\,y$ of Fig. 1. Fig. 3 is a detail of a portion of the sieve-frame and sieve.

The miner's gold-pan is made of different sizes, the largest seldom exceeding sixteen and one-half inches in largest diameter, being in use in all mining countries to precipitate and concentrate particles of metals and minerals from debris by the action of specific gravity, the aid of water, and proper manipulation. Whether the material containing the desired result is gravel, debris of minerals, or pulp from rock-crushing contrivances the manipulation is the same.

The gold-pan, large or small, containing the stuff to be concentrated is immersed in water by the manipulator. The material is washed with the hands, dissolving clayey matter, if present, then rotating and shaking the pan and floating out mud and organic matter. The coarser pieces of waste are thrown out with the fingers. A rotary motion alternating with side-shaking will precipitate the heavier ingredients to the bottom of the pan gradually. In the meantime the operator floats the lighter debris toward and over the front side of the pan. This diminishes the contents. The panner inclines the pan toward the front as may be required, so as to keep the residue together, the heavier particles gathered under the lighter portion; but no matter how experienced and careful the panner is the heavier material will gather on the sides of the pan also, whereas it would be very desirable to have the concentrates gather mostly near the linear center of the pan in line with the operator. When the concentrates gather on each side principally, a careless or too violent shake will again mix such heavy material with the light and worthless stuff, prolonging the process and causing loss of time and in results.

Another annoyance in panning is that the water causes heavy particles, even gold, to slip easily and quickly upon the smooth surface of the sides and bottom of the pan. A slight obstruction, a dent or roughness, will prevent it and form there a nucleus for concentrates to adhere and gather.

My invention is designed to overcome the above-named objections and to provide a pan which is more easily and rapidly manipulated and surer in results.

A is a pan having a convex circular rib $a$, designed to improve the process of panning. The heavy desirable material once precipitated below the periphery of the rib $a$ it can be easily kept below it by any ordinary operator. Again, when the larger portion of worthless stuff has been eliminated it will be found that the rib $a$ will not permit any slipping outward of desired particles and will therefore prevent loss of such and also tend to cleaning the residue in shorter time.

$b\,b\,b$ represent crescent-shaped indentations to be shallow and of curved shape laterally, lessening in depth near the ends of the indentations, the ends to point toward the right and left sides of the operator when panning. These indentations will guide heavy particles and gather them in and mostly at the linear center of the pan, in line with the manipulator, and not on the sides of the pan, as heretofore. When the contents have diminished so that special care is required, the pan is then turned one-quarter around until the channels are essentially in line toward the discharge edge, so as to permit the concentrates that may be held in the indentations to glide out of them and gather below and against the rib $a$, where the process is completed.

C represents the bottom of the pan, and $a\,a$ the circular rib.

D is a sheet-metal or wire sieve-frame fitting snugly into the pan, with sieve $d$ attached, as shown.

D' is the corrugated lower portion of the sieve-frame, permitting wire of proper mesh to be fastened to it in the perforations, as shown.

The sieve-frame is designed to rest partly on the circular rib $a\,a$, but to secure stability the top of the sieve-frame is curved or hooked over the upper edge of the pan, so as to keep the sieve from shifting when in use and to prevent wear.

Especially when panning gravel or coarse debris the sieve, as shown and described, will be found a great convenience.

When the space below the sieve has been filled with material that passed through it, the sieve can be raised sufficiently, so as to retain no smaller stuff than will go through it. The sieve is then lifted out of the water and pan and panning proceeded with.

I claim all and each of the improvements as invented by me and described herein to be very useful and applicable to any size of gold-pan, (large or small.) A small size would easily compete with and will be more convenient than the time-honored "batea" and "horn-spoon," both of which are a necessity and universally used at mines, mills, assay-offices, reduction-works, and metallurgical laboratories to test small quantities of minerals, &c.

Having thus described my invention, what I claim as new, and desire to secure by Letters Patent, is—

1. In a gold-washing pan, the sides thereof converging from the top toward the bottom and having an inwardly-projecting rib, said bottom having crescent-shaped indentations of curved form laterally and lessening in depth near the ends.

2. In a gold-washing pan a sieve or screen frame fitting the interior of the pan, and having its upper edge curved or hooked to fit ever the corresponding edge of the pan, and a sieve-bottom fixed to said screen-frame so as to leave a space between itself and the bottom of the pan.

3. In a gold-washing pan for hand washing, a pan having an annular rib formed upon its inner sides between the top and bottom, a screen-frame having a corrugated lower portion adapted to be supported on said rib and having its upper edge to fit over the top edge of the pan, and a sieve-bottom secured to the corrugated lower portion of the frame.

4. In combination with a gold-washing pan having a rib on its inner sides between the top and bottom, a sieve-frame having an annular, inwardly-projecting rib about its bottom to rest in contact with the first-named rib, and provided with perforations, and a screen or sieve formed of wires the ends of which are secured in said perforations.

In witness whereof I have hereunto set my hand.

FREDERICK SLETCHER.

Witnesses:
S. H. NOURSE,
JESSIE C. BRODIE.